United States Patent
Li et al.

(10) Patent No.: US 12,227,464 B2
(45) Date of Patent: Feb. 18, 2025

(54) CMAS-RESISTANT ENVIRONMENTAL BARRIER COATING SYSTEM

(71) Applicants: Rolls-Royce Corporation, Indianapolis, IN (US); Rolls-Royce North American Technologies, Inc., Indianapolis, IN (US)

(72) Inventors: Li Li, Carmel, IN (US); Matthew T. Kush, Martinsville, IN (US); Robert Alexander Sean Golden, Noblesville, IN (US); Jun Shi, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 320 days.

(21) Appl. No.: 17/302,996

(22) Filed: May 18, 2021

(65) Prior Publication Data
US 2022/0371967 A1 Nov. 24, 2022

(51) Int. Cl.
*C04B 41/89* (2006.01)
*C04B 35/16* (2006.01)
(Continued)

(52) U.S. Cl.
CPC ............ *C04B 41/526* (2013.01); *C04B 35/16* (2013.01); *C04B 35/80* (2013.01); *C04B 41/009* (2013.01);
(Continued)

(58) Field of Classification Search
CPC ....... C23C 14/08; C23C 14/083; C23C 16/40; C23C 16/405; C23C 28/04; C23C 28/042;
(Continued)

(56) References Cited

U.S. PATENT DOCUMENTS

| 5,073,433 A | 12/1991 | Taylor |
| 7,595,114 B2 | 9/2009 | Meschter et al. |

(Continued)

FOREIGN PATENT DOCUMENTS

| EP | 1642993 B1 | 11/2012 |
| EP | 3235795 A1 | 4/2017 |

(Continued)

OTHER PUBLICATIONS

Hubbard et al., "RIR—Measurement and Use in Quantitative XRD," Powder Diffraction, vol. 3, No. 2, Jun. 1988, p. 74.
(Continued)

*Primary Examiner* — Z. Jim Yang
(74) *Attorney, Agent, or Firm* — Shumaker & Sieffert, P.A.

(57) ABSTRACT

An article may include a substrate, such as a silicon-containing ceramic matrix composite, an environmental barrier coating (EBC) layer on the substrate, and a CMAS-resistant EBC layer on the EBC layer. The EBC layer may include at least one rare-earth disilicate (REDS). The CMAS-resistant EBC layer may include at least one rare-earth monosilicate (REMS) configured to react with CMAS to form crystalline reaction products. The CMAS-resistant EBC layer may include a plurality of vertical cracks extending from a surface of the CMAS-resistant EBC layer at least partially into the CMAS-resistant EBC layer. Additionally, or alternatively, the EBC layer may include a plurality of vertical cracks extending from a surface of the EBC layer into at least a portion of the EBC layer.

20 Claims, 5 Drawing Sheets

(51) Int. Cl.
*C04B 35/80* (2006.01)
*C04B 41/00* (2006.01)
*C04B 41/50* (2006.01)
*C04B 41/52* (2006.01)
*C04B 41/87* (2006.01)
*F01D 5/28* (2006.01)
*C04B 103/61* (2006.01)
*C04B 111/00* (2006.01)
*C04B 111/20* (2006.01)

(52) U.S. Cl.
CPC .......... *C04B 41/5024* (2013.01); *C04B 41/87* (2013.01); *C04B 41/89* (2013.01); *F01D 5/288* (2013.01); *C04B 2103/61* (2013.01); *C04B 2111/00431* (2013.01); *C04B 2111/20* (2013.01); *C04B 2111/2038* (2013.01); *C04B 2235/3427* (2013.01); *C04B 2235/3826* (2013.01); *C04B 2235/5244* (2013.01)

(58) Field of Classification Search
CPC ....... C23C 28/30; C23C 28/34; C23C 28/345; C23C 28/3455; C23C 28/40; C23C 28/42; C04B 41/52–526; C04B 41/85; C04B 41/87; C04B 41/89; F01D 5/288; F05D 2230/90; F05D 2230/611; F05D 2230/6111
See application file for complete search history.

(56) References Cited

U.S. PATENT DOCUMENTS

| | | | |
|---|---|---|---|
| 8,124,252 B2 | 2/2012 | Cybulsky et al. | |
| 8,470,460 B2 | 6/2013 | Lee | |
| 9,365,725 B2 | 6/2016 | Sarrafi-Nour et al. | |
| 10,125,618 B2 | 11/2018 | Lee | |
| 11,608,749 B2 * | 3/2023 | Jackson | F01D 5/284 |
| 2003/0138658 A1 | 7/2003 | Taylor et al. | |
| 2005/0221109 A1 * | 10/2005 | Torigoe | C23C 28/3455 416/241 B |
| 2006/0014029 A1 | 1/2006 | Saak et al. | |
| 2006/0151856 A1 * | 7/2006 | Torigoe | C23C 28/3215 257/632 |
| 2007/0099013 A1 * | 5/2007 | Rowe | C23C 28/042 427/372.2 |
| 2007/0141269 A1 * | 6/2007 | Stowell | C23C 28/345 427/456 |
| 2009/0176059 A1 * | 7/2009 | Namba | C23C 4/02 428/471 |
| 2009/0274850 A1 * | 11/2009 | Bhatia | C23C 26/00 427/540 |
| 2010/0080984 A1 | 4/2010 | Lee | |
| 2013/0136915 A1 | 5/2013 | Naik | |
| 2014/0261080 A1 | 9/2014 | Lee | |
| 2014/0272197 A1 * | 9/2014 | Lee | C23C 14/30 427/596 |
| 2015/0159507 A1 * | 6/2015 | Sivaramakrishnan | F01D 5/288 428/596 |
| 2016/0108510 A1 | 4/2016 | Kirby et al. | |
| 2016/0251971 A1 * | 9/2016 | Düsterhöft | F01D 9/02 428/213 |
| 2016/0369637 A1 * | 12/2016 | Subramanian | F01D 5/288 |
| 2017/0081250 A1 * | 3/2017 | Kamel | B33Y 70/00 |
| 2018/0010469 A1 | 1/2018 | Kadau et al. | |
| 2018/0037515 A1 * | 2/2018 | Matsumoto | C04B 41/87 |
| 2018/0163062 A1 | 6/2018 | Hoel et al. | |
| 2018/0179645 A1 * | 6/2018 | Flores Renteria | C23C 28/3215 |
| 2018/0290929 A1 * | 10/2018 | Clark | C23C 28/042 |
| 2019/0078215 A1 * | 3/2019 | Wessels | C23C 28/3215 |
| 2019/0092702 A1 * | 3/2019 | Yamaguchi | C04B 41/89 |
| 2019/0233929 A1 * | 8/2019 | Torigoe | C23C 4/134 |
| 2020/0087220 A1 * | 3/2020 | Olson | F01D 5/284 |
| 2020/0102843 A1 * | 4/2020 | Bianchi | C23C 4/129 |
| 2020/0123071 A1 * | 4/2020 | Ndamka | C23C 4/11 |
| 2020/0157692 A1 * | 5/2020 | Halady Subraya Bhat | C23C 28/048 |
| 2020/0199027 A1 * | 6/2020 | Chamberlain | F01D 5/288 |
| 2021/0087695 A1 * | 3/2021 | Chen | C23C 28/3455 |
| 2021/0140327 A1 * | 5/2021 | Bianchi | C04B 41/5042 |
| 2021/0140339 A1 * | 5/2021 | Chen | C23C 28/3455 |
| 2021/0323868 A1 * | 10/2021 | Wadley | C04B 41/87 |
| 2021/0331983 A1 * | 10/2021 | Chen | C04B 41/009 |
| 2022/0154592 A1 * | 5/2022 | Zois | F01D 5/288 |
| 2022/0333494 A1 * | 10/2022 | Subramanian | C23C 4/18 |
| 2024/0011403 A1 * | 1/2024 | Chen | F01D 25/007 |
| 2024/0109812 A1 * | 4/2024 | Flores Renteria | C23C 14/3414 |

FOREIGN PATENT DOCUMENTS

| | | | | |
|---|---|---|---|---|
| WO | 2017154559 A1 | 9/2017 | | |
| WO | WO-2020131929 A1 * | 6/2020 | ........... | C04B 35/195 |

OTHER PUBLICATIONS

Zhu et al., "Development of Advanced Environmental Barrier Coatings for SiC/SiC Ceramic Matrix Composites: Path toward 2700° F. Temperature Capability and Beyond," 41st Annual Conference on Composites, Materials, and Structures, Jan. 23-27, 2017, 24 pp.

Webster et al., "Mixed Ytterbium Silicate Environmental Barrier Coating Materials for CMAS Resistance," Gordon Research Seminar: High Temperature Corrosion 2019, Deposit Induced Corrosion of Alloys and Coatings, Jul. 20, 2019, 30 pp.

Webster et al., "Interaction of Yb2Si2O7 and Yb2SiO5 Environmental Barrier Coating Materials with CMAS Melts," 43rd International Conference and Exposition on Advanced Ceramics and Composites Session—CMAS Degradation of EBC/TBC: Effects and Mitigation Strategies I, Jan. 29, 2019, 20 pp.

Poerschke et al., "Stability and CMAS Resistance of Ytterbium-Silicate/Hafnate EBCs/TBC for SiC Composites", Jan. 2015, The American Ceramic Society, 9 pgs.

Shinde et al., "Segmentation crack formation dynamics during air plasma spraying of zirconia", Nov. 2019, Center for Thermal Spray Research, 11 pgs.

Spitsberg et al., "Thermal and Environmental Barrier Coatings for SiC/SiC CMCs in Aircraft Engine Applications", Int. J. Appl. Ceram. Technol., 1 [4] 291-301 (2004), 11 pgs. (Applicant points out, in accordance with MPEP 609.04(a), that the year of publication, 2004, is sufficiently earlier than the effective U.S. filing date, so that the particular month of publication is not in issue.).

* cited by examiner

CMAS-RESISTANT ENVIRONMENTAL BARRIER COATING SYSTEM

TECHNICAL FIELD

The present disclosure generally relates to coating systems for high-temperature mechanical systems, such as gas turbine engine components.

BACKGROUND

The components of gas turbine engines operate in severe environments. For example, the high-pressure turbine airfoils exposed to hot gases in commercial aeronautical engines may experience surface temperatures up to about 1500° C. Components of high-temperature mechanical systems may include a superalloy substrate, a ceramic substrate, or a ceramic matrix composite (CMC) substrate. In many examples, the substrates may be coated with one or more coatings to modify properties of the surface of the substrate. For example, superalloy, ceramic, or CMC substrates may be coated with a thermal barrier coating (TBC) to reduce heat transfer from the external environment to the substrate, an environmental barrier coating (EBC) to reduce exposure of the substrate to environmental species, such as oxygen, water vapor, or calcia-magnesia-alumina-silicate (CMAS) containing materials, an abradable coating to improve a seal, or combinations thereof.

SUMMARY

In some examples, the disclosure describes articles, systems, and techniques relating to a coating system on a substrate such as a silicon containing superalloy, ceramic, or ceramic matrix composite (CMC) substrate. The coating system may include an environmental barrier coating (EBC) layer having a composition configured to improve calcia-magnesia-alumina-silicate (CMAS) resistance, and a physical structure configured to improve mechanical performance of the coating system, compared to other coatings.

In one example, the disclosure describes an article that includes a substrate, an EBC layer on the substrate, and a CMAS-resistant EBC layer on the first surface of the EBC layer. The EBC layer may include at least one rare-earth disilicate (REDS), and define a first surface opposite the substrate. The CMAS-resistant EBC layer may include at least one rare-earth monosilicate (REMS) configured to react with CMAS to form at least one crystalline reaction product, and define a second surface opposite the EBC layer. Either the EBC layer includes a plurality of vertical cracks extending from the first surface into the EBC layer or the CMAS-resistant EBC layer includes a plurality of vertical cracks extending from the second surface into the CMAS-resistant EBC layer.

In another example, the disclosure describes an article that includes a substrate, an EBC layer on the substrate, and a CMAS-resistant EBC layer on the surface of the EBC layer. The EBC layer may include a REDS, and define a surface and a plurality of vertical cracks extending from the surface into the EBC layer. The CMAS-resistant EBC layer may include at least one REMS configured to react with CMAS to form at least one crystalline reaction product. A porosity of the CMAS-resistant EBC layer may be less than about 15 volume percent.

In another example, the disclosure describes a method that includes forming an EBC layer on a substrate, where the EBC layer may include at least one REDS, and the EBC layer defines a first surface opposite the substrate. The method also includes forming a CMAS-resistant EBC layer on the first surface of the EBC layer, where the CMAS-resistant EBC layer includes at least one REMS configured to react with CMAS to form at least one crystalline reaction product, and where the CMAS-resistant EBC layer defines a second surface. At least one of forming the EBC layer includes forming a plurality of vertical cracks extending from the first surface into the EBC layer, or forming the CMAS-resistant EBC layer includes forming a plurality of vertical cracks extending from the second surface into the CMAS-resistant EBC layer.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes articles, systems, and techniques relating to substrate coating systems including at least one environmental barrier coating (EBC) layer having a composition configured to improve calcia-magnesia-alumina-silicate (CMAS) resistance and a physical structure configured to improve mechanical performance (e.g., compliance) of the coating system compared to some other EBCs.

In the context of gas turbine engines, increasing demands for greater operating efficiency (e.g., fuel efficiency) has led to the operation of gas turbine engines at higher temperatures. In some examples, substrates, such as superalloy, ceramic, or CMC substrates, of high-temperature mechanical systems are coated with a coating system to provide environmental protection for underlying coatings and/or substrate in a high temperature environment. A coating system may be deleteriously attacked by CMAS from the ingestion of siliceous minerals (e.g., airborne dust, sand, volcanic dust and ashes, fly ash, runway debris, concrete dust, fuel residue, and the like) in the intake gas drawn through the gas turbine engine. For example, when siliceous debris such as sand and dust is ingested into the engine, it can melt and deposit on the coating systems of engine hot section components (e.g. seal segments, vanes, and blades). These partial or fully molten deposits are commonly referred to as calcium-magnesium-alumino-silicates (CMAS)

because the primary oxide constituents are CaO, MgO, $Al_2O_3$ and $SiO_2$. Once molten CMAS has deposited on the surface of a coating system, the CMAS may dissolve, react with, and/or infiltrate the coating system which leads to coating recession and/or spallation. In some examples, increased operating temperatures, may lead to increased damage due to the presence of CMAS deposits within the high temperature environments. Therefore, it may be preferable that coating systems possess sufficient CMAS resistance to meet coating life requirements.

In some examples, a coating system may include a silicon-based bond coat and a CMAS-resistant EBC layer on the bond coat. The CMAS-resistant EBC layer may include a rare-earth (RE) monosilicate and an optional RE disilicate, each including one or more RE cations. In some examples, the RE monosilicate may improve CMAS resistance of the EBC layer compared to an EBC layer without the RE monosilicate. For example, the RE monosilicate may improve CMAS-resistant properties by reacting with CMAS to form a primary phase as well as a RE apatite phase, e.g., during operation of the article within a high temperature environment. However, a coefficient of thermal expansion (CTE) of the RE monosilicate and a CTE of the substrate (e.g., a CMC substrate) or other underlying coating layers may have a mismatch that inhibits application of a CMAS-resistant EBC layer with a RE monosilicate content configured to provide a selected CMAS resistance. For example, a CMAS-resistant EBC layer with a RE monosilicate content configured to provide a selected CMAS resistance may crack or spall during thermal cycling of the article.

To reduce cracking or spalling, an architecture of the EBC layer may be controlled to improve a compliancy of the CMAS-resistant EBC layer. In some examples, the architecture may include vertical cracks in the CMAS-resistant EBC layer. While cracks may provide infiltration pathways for CMAS, the RE monosilicate may react with the CMAS to form crystalline reaction products (e.g., apatite) at the crack openings, thereby reducing further CMAS infiltration.

A CMAS-resistant coating system may include two or more EBC layers, at least one of which has a higher RE monosilicate content relative to the other layers of the coating system. The arrangement of layers, including layers with vertical cracks, may be selected to control CTE mismatch between adjacent layers to reduce cracking or spallation during thermal cycling.

Figure 1:
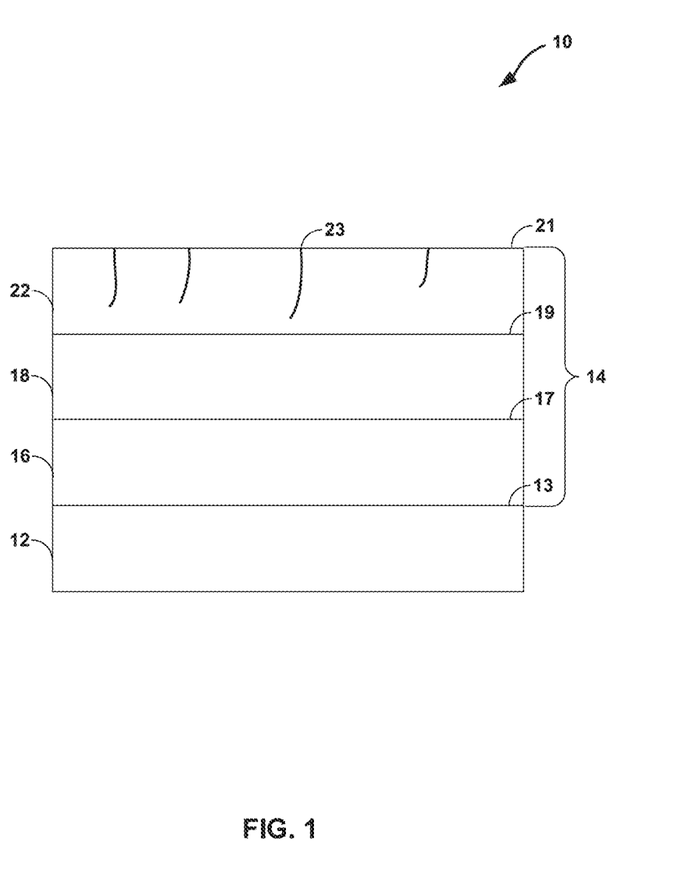
FIG. 1 is a conceptual diagram illustrating an example article including a substrate and a coating system having a CMAS-resistant EBC layer that includes a plurality of vertical cracks.

FIG. 1 is a conceptual diagram illustrating an example article 10 including a substrate 12 and a coating system 14. Coating system 14 includes an optional bond coat 16, an optional EBC layer 18 (referred to herein as "EBC 18"), and a CMAS-resistant EBC layer 22 (referred to herein as "CMAS-EBC 22"). CMAS-EBC 22 is configured to improve calcia-magnesia-alumina-silicate (CMAS) resistance and a physical structure configured to improve mechanical performance of the coating system, compared to other EBCs.

In some examples, article 10 may include a component of a high temperature mechanical system, such as a gas turbine engine. For example, article 10 may include a part that forms a portion of a flow path structure, a seal segment, a blade track, an airfoil, a blade, a vane, a combustion chamber liner, or another portion of a gas turbine engine.

Substrate 12 may include a material suitable for use in a high-temperature environment. In some examples, substrate 12 may include a superalloy, a ceramic, or a ceramic matrix composite (CMC). Example superalloys may include, but are not limited to, nickel-base superalloys, cobalt-based superalloys, or iron-based superalloys. Example ceramics, may include, but are not limited to, a silicon-containing ceramic, such as silica ($SiO_2$) and/or silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or ceramics suitable to use in high temperature mechanical systems. In some examples in which substrate 12 includes a ceramic, the ceramic may be substantially homogeneous.

In examples in which substrate 12 includes a CMC, substrate 12 may include a matrix material and a reinforcement material. The matrix material may include, but is not limited to, silicon metal, a ceramic material, silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), a metal oxide, or alumina ($Al_2O_3$). The reinforcement material may include continuous fibers and/or discontinuous fibers, whiskers, platelets, or particulates. Generally, fibers of a reinforcement material may have any suitable fiber denier. In some examples, the reinforcement material may include a monofilament or multifilament two-dimensional or three-dimensional weave, braid, fabric, or the like. For example, the reinforcement material may be in the form of one or more fiber layers (e.g., fiber plies, which generally extend along an x-y plane) stacked on each other, and may include one or more optional z-directional fibers to attach the stacked layers to each other. The reinforcement material may include, but is not limited to, carbon (C), silicon carbide (SiC), silicon nitride ($Si_3N_4$), alumina ($Al_2O_3$), an aluminosilicate, silica ($SiO_2$), a transition metal carbide, or silicide (e.g. WC, $Mo_2C$, TiC, $MoSi_2$, $NbSi_2$, $TiSi_2$), combinations thereof, or the like. In some examples, substrate 12 may take the form of a reaction bonded SiC substrate.

Substrate 12 may be manufactured using one or more techniques including, for example, chemical vapor deposition (CVD), chemical vapor infiltration (CVI), polymer impregnation and pyrolysis (PIP), slurry infiltration, melt infiltration, combinations thereof, or other techniques.

Coating system 14 is on surface 13 of substrate 12. As used herein, "formed on," "disposed on," and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on," "disposed directly on," and "directly on" denote a layer or coating that is formed immediately adjacent another layer or coating, e.g., there are no intermediate layers or coatings. For example, as shown in FIG. 1, bond coat 16 of coating system 14 may be directly on substrate 12. In other examples, one or more coatings or layers of coatings may be between coating 16 of coating system 14 and substrate 12.

Coating system 14 is configured to protect substrate 12 from chemical species present in the environment during use of article 10, such as, e.g., water vapor, calcia-magnesia-alumina-silicate (CMAS), or other substances that may degrade or otherwise reduce the useable life of article 10. For example, the composition of substrate 12, bond coat 16, and/or EBC 18 may be susceptible to CMAS attack, e.g., where molten CMAS may dissolve the respective layers and/or substrate 12, which may ultimately lead to spallation and/or partial or complete dissolution of coating system 14. Additionally, in some examples, coating system 14 may include a thermal barrier coating (TBC), abradable coating, erosion resistant coating, or the like.

Coating system 14 includes CMAS-EBC 22. A composition of CMAS-EBC is configured to resist degradation of coating system 14 due to infiltration of CMAS. Additionally, a physical structure of CMAS-EBC 22, including vertical cracks in at least a portion of CMAS-EBC 22, is configured to improve mechanical performance, such as the compliance of CMAS-EBC 22 relative to other layers of coating system 14, particularly during operation (e.g., thermal cycling) of article 10.

CMAS-EBC 22 may include at least one rare-earth monosilicate (REMS) (e.g., $RE_2SiO_5$, where RE is a rare-earth element) and, optionally, at least one rare-earth disilicate (REDS) (e.g., $RE_2Si_2O_7$, where RE is a rare-earth element). The rare-earth element in the REMS and REDS may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc). For example, CMAS-EBC 22 may include ytterbium disilicate (YbDS) and ytterbium monosilicate (YbMS).

In some examples, CMAS-EBC 22 may include a REMS and/or REDS composition including multiple RE metal cations, e.g., a mixed RE composition. The RE cations of the mixed RE composition may be selected to improve CMAS resistance, to reduce a difference in the coefficient of thermal expansion between CMAS-EBC 22 and adjacent coating layers, and/or to lower thermal conductivity of CMAS-EBC 22, compared to a REMS or a REDS with only one RE cation. For example, if an adjacent coating layer (e.g., EBC 18) includes mixed RE composition REDS, CMAS-EBC 22 may include a REMS having the same or similar mixed RE composition.

To provide CMAS resistance, the REMS composition of CMAS-EBC 22 may be configured to react with a CMAS material to form a primary phase as well as a RE apatite phase during operation of article 10 in a high temperature environment. In examples in which the REMS includes two or more RE cations, the different RE cations of the mixed RE monosilicate composition may be selected such that the RE apatite phase formed from the reaction with CMAS is stable over the operating temperature range of the article (e.g., from room temperature, e.g., about 23° C., to about 1500° C.). In this way, CMAS-EBC 22 may act as a barrier that reduces infiltration of the CMAS and, thereby, reduces dissolution or spallation of underlying layers.

In some examples, the primary and/or apatite phases resulting from a reaction of the REMS of CMAS-EBC 22 may depend on the composition of the CMAS material reacting with the REMS. For example, when in contact with a $SiO_2$-lean CMAS composition (e.g. Ca:Si ratio (Ca/Si) greater than to 0.5), the REMS of CMAS-EBC 22 may be configured to react to form a primary apatite phase with the composition of $M_2RE_8(SiO_4)_6O_2$, where M is Ca, Mg, Al, Fe, Ti, Ni, K, Zr, Hf, and/or Na, and a RE apatite phase with the composition of $xRE_2O_3 \cdot ySiO_2$, where the x:y ratio (x/y) is 0.5<x/y<1 (e.g. $2RE_2O_3 \cdot 3SiO_2$). Conversely, when in contact with $SiO_2$-rich CMAS compositions (e.g., Ca:Si ratio (Ca/Si) less than or equal to 0.5) the REMS of CMAS-EBC 22 may react to form a RE disilicate phase (primary phase) and/or a RE apatite phase with the composition of $xRE_2O_3 \cdot ySiO_2$ where the x:y ratio (x/y) is 0.5≤x/y<1 (e.g. $2RE_2O_3$ $3SiO_2$). In some examples, the reaction products of the reaction between the REMS of CMAS-EBC 22 and the CMAS material may be comprised of a single RE cation (e.g. $Ca_2Yb_8(SiO_4)_6O_2$, $2Yb_2O_3 \cdot 3SiO_2$) or a mixture of up to three RE cations with varying molar concentrations of the RE cation (e.g. $Ca_2(Yb_{0.5}, Lu_{0.5})_8(SiO_4)_6O_2$, $2(Yb_{0.5}, Lu_{0.5})_2O_3 \cdot 3SiO_2$).

In some examples, the formation of a RE apatite may acts as secondary barrier (with the first barrier being the primary apatite and/or REDS) to slow or reduce the CMAS infiltration and/or dissolution of CMAS-EBC 22 and/or underlying layers, such as EBC 18. In some examples, RE silicates (e.g., RE silicates with only a single metal cation) that are capable of forming a RE apatite may only do so at temperatures greater than the operating conditions of the high temperature combustion engine (e.g., temperatures greater than or equal to about 1600° C.). In some examples, a mixed REMS composition may include RE metal cations that are selected such that the REMS composition forms a stable RE apatite phase at room temperature (about 23° C.) and/or throughout the entire operating range of the engine (e.g., room temperature above, about 23° C. to about 2000° C. or about 23° C. to about 1500° C.) to provide the CMAS-resistant properties. The RE apatite phase may be stable at the described temperature from about 1 atmosphere to about 60 atmospheres.

In some examples, CMAS-EBC 22 may include additional materials, such as, for example, one or more of a rare-earth oxide (including a RE cation discussed above), an additional rare-earth silicate, an aluminosilicate, an alkaline earth aluminosilicate, mullite, barium strontium aluminosilicate (BSAS), barium aluminosilicate (BAS), or strontium aluminosilicate (SAS).

The amount of REDS and/or REMS in CMAS-EBC 22 may include any suitable weight percent (wt. %) configured to provide a selected CMAS resistance. In some examples, CMAS-EBC 22 may include greater than about 20 wt. % REMS, such as greater than about 30 wt. % REMS, greater than about 40 wt. % REMS, or greater than about 50 wt. % REMS. The presence of the REMS phase in CMAS-EBC 22 may improve CMAS resistance and/or water vapor resistance compared to a coating without a REMS. For example, the REMS may react with CMAS and/or water vapor to form crystalline reaction products (e.g., apatite) to reduce degradation of CMAS-EBC 22 or other layers of coating system 14. A greater amount of REMS in CMAS-EBC 22 may improve CMAS resistance compared to a lesser amount of REMS.

A coefficient of thermal expansion (CTE) of the REMS and other layers of coating 14 and/or substrate 12 may be mismatched. The CTE mismatch may decrease the mechanical performance of coating system 14, such as, for example, increased spallation during operation of article 10. Greater amounts (e.g., wt. %) of REMS may increase the CTE mismatch. In view of the CTE mismatch, the physical structure of CMAS-EBC 22 may be selected or controlled to improve compliance of CMAS-EBC 22 to improve the mechanical performance of coating system 14. For example, the physical structure of CMAS-EBC 22 may be controlled to include vertical cracking in CMAS-EBC 22.

Vertical cracks, e.g., vertical crack 23, may increase compliance and/or relieve coating stress within CMAS-EBC 22. Vertical cracks 23 may be formed via a selected coating application process and/or a selection of coating process parameters. For example, thermal spraying a coating material of CMAS-EBC 22 onto a preheated surface of substrate 12 may result in vertical cracks 23. Additionally, or alternatively, thermal spraying a coating material of CMAS-EBC 22 onto substrate 12 with a reduced stand-off distance of a thermal spray device, e.g., relative to a standard stand-off distance, may result in vertical cracks 23. Vertical cracks 23 in CMAS-EBC 22 may include any suitable density of cracks to provide a selected compliance. For example, a greater density of vertical cracks may increase compliance compared to a lesser density of vertical cracks. In some examples, a density of vertical cracks may be within a range from about 5 cracks per inch to about 500 cracks per inch, such as about 10 cracks per inch to about 300 cracks per inch. The vertical cracks may extend from surface 21 of CMAS-EBC at least partially into CMAS-EBC 22. In some examples, the vertical cracks may extend through an entire thickness of CMAS-EBC 22. In some examples, the vertical cracks may extend into coating layers adjacent to CMAS-EBC 22, e.g., at least partially into optional EBC layer 18. Although the vertical cracks may extend into adjacent layers, the vertical cracks may not extend to optional bond coat 16.

CMAS-EBC 22 may include any suitable porosity. In some examples, a porosity of CAM-EBC 22 may be selected to improve CMAS resistance of CMAS-EBC 22, e.g., compared to a more porous coating layer. For example, a porosity of CMAS-EBC 22 may be less than about 40 volume percent (vol. %), such as less than about 15 vol. % or less than about 10 vol. %. The porosity of CMAS-EBC 22 includes the volume of vertical cracks 23, as well as any other pores or void space within CMAS-EBC 22. As described herein, porosity may be measured using mercury porosimetry, optical microscopy, Archimedean method, or other methods suitable for measuring porosity of a coating. In some examples, a lower porosity of CMAS-EBC 22 may reduce infiltration of CMAS better than a similar layer having a greater porosity. In some examples, CMAS-EBC 22 may include one or more dopants, such as, $Al_2O_3$, $Fe_2O_3$, $Fe_3O_4$, $RE_2O_3$, $Ta_2O_5$, $HfO_2$, $ZrO_2$, CaO, MgO, SrO, $LiREO_2$ and/or $RE_3Al_5O_{12}$ (e.g. YbAG or YAG), configured to reduce the porosity of CMAS-EBC 22 compared to a composition without the one or more dopants. For example, the dopants may act as sintering aids that densify CMAS-EBC 22 (e.g., to provide reduced porosity) which results in an increase in coating hermeticity (e.g., to slow oxidant transport through the coating 14). The dopants may be added to the CMAS-EBC 22 composition, e.g., up to about 15 mol. % or greater in some examples.

CMAS-EBC 22 may include any suitable thickness. In some examples, the thickness of CMAS-EBC 22 may be selected to provide a desired compliance, CMAS-resistance, or both. For example, a thickness of CMAS-EBC 22 may be within a range from about 25 microns (about 1 thousandth of an inch (mil)) to about 254 microns (about 100 mil), such as about 50 microns (about 2 mil) to about 1550 microns (about 60 mil).

CMAS-EBC 22 may be applied using, for example, thermal spraying, e.g., air plasma spraying, high velocity oxy-fuel (HVOF) spraying, low vapor plasma spraying, suspension plasma spraying (SPS); physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition (EPD); or the like.

In some examples, the porosity of CMAS-EBC 22 may be created and/or controlled by plasma spraying the coating material using a co-spray process technique in which the coating material and a coating material additive are fed into a plasma stream with two radial powder feed injection ports. The feed pressures and flow rates of the coating material and coating material additive may be adjusted to inject the material on the outer edge of the plasma plume, e.g., using direct 90-degree angle injection. This may permit the coating material particles to soften but not completely melt, and the coating material additive to not burn off, but rather soften sufficiently for adherence within coating system 14.

In other examples, the porosity of CMAS-EBC 22 may be controlled by the use of coating material additives and/or processing techniques to create the desired porosity. For example, a fugitive material that melts or burns at the use temperatures of article 10 (e.g., a blade track) may be incorporated into the coating material. The fugitive material may include, for example, graphite, hexagonal boron nitride, or a polymer such as a polyester, and may be incorporated into the coating material prior to deposition of the coating material on substrate 12. The fugitive material then may be melted or burned off in a post-formation heat treatment, or during operation of article 10, to form pores.

In examples in which CMAS-EBC 22 includes vertical cracks, CMAS-EBC 22 may be deposited using an air plasma spray technique, a SPS technique, an EB-PVD technique, a plasma spray physical vapor deposition (PSPVD) technique, or a directed vapor deposition (DVD) technique to form a columnar microstructure including the vertical cracks during application of the coating material.

Coating system 14 may include an optional bond coat 16. Bond coat 16 is configured to increase the adhesion of an overlying coating layer (e.g., optional EBC 18 or CMAS-EBC 22) to substrate 12. Bond coat 16 may be in direct contact with surface 13 of substrate 12 and EBC layer 18 may be in direct contact with surface 17 of bond coat 16. In examples in which coating system does not include EBC 18, CMAS-EBC 22 may be in direct contact surface 17 of bond coat 16.

Bond coat 16 may include any suitable material configured to improve adhesion between substrate 12 and an overlying coating layer. In some examples, bond coat 16 may include silicon, silicon carbide, silicon oxide, a metal silicide, RE monosilicate, RE disilicate, hafnium silicate, mullite, a metal oxide, BSAS, or a mixture thereof. In examples in which substrate 12 includes a ceramic or CMC, bond coat 16 may include a ceramic or another material that is compatible with the material from which substrate 12 is formed. For example, bond coat 16 may include mullite (aluminum silicate, $Al_6Si_2O_{13}$), silicon metal or alloy, silica, a silicide, or the like. Bond coat 16 may further include other elements, such as a rare earth oxide or rare earth silicate including an oxide or silicate of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and/or scandium (Sc).

In some examples, the composition of bond coat 16 may be selected based on the chemical composition and/or phase constitution of substrate 12 and the overlying layer (e.g., EBC layer 18). For example, if substrate 12 includes a ceramic or a CMC, bond coat 26 may include silicon metal or alloy or a ceramic, such as, for example, mullite.

Bond coat 16 may include any suitable thickness that is configured to improve adhesion between substrate 12 and an overlying coating layer. In some examples, bond coat 16 has a thickness of approximately 25 microns (about 1 mil) to approximately 250 microns (about 10 mil), although other thicknesses are contemplated.

In some examples, bond coat 16 may include multiple layers. For example, in some examples in which substrate 12 includes a CMC including silicon carbide, bond coat 16 may include a layer of silicon on substrate 12 and a layer of mullite, a rare earth silicate, or a mullite/rare earth silicate dual layer on the layer of silicon. In some examples, bond coat 16 including multiple layers may provide multiple functions of bond coat 16, such as, for example, adhesion of substrate 12 to an overlying layer (e.g., EBC layer 18), chemical compatibility of bond coat 16 with each of substrate 12 and the overlying layer, a better CTE match of adjacent layers, or the like.

Bond coat 16 may be applied on substrate 12 using, for example, thermal spraying, e.g., air plasma spraying, HVOF spraying, low vapor plasma spraying, SPS; PVD, e.g., EB-PVD, DVD, cathodic arc deposition; CVD; slurry process deposition; sol-gel process deposition; EPD; or the like.

In some examples, coating system 14 may include optional EBC 18. EBC 18 may be configured to provide additional protection against chemical attack from species present in the operating environment of article 10, such as CMAS and/or water vapor. In some examples, EBC 18 may include at least one of a rare-earth oxide, a rare-earth silicate, an aluminosilicate, or an alkaline earth aluminosilicate. For example, EBC 18 may include at least one of mullite, barium strontium aluminosilicate (BSAS), barium aluminosilicate (BAS), or strontium aluminosilicate (SAS). Additionally, or alternatively, EBC 18 may include at least one REMS and/or at least one REDS, as discussed above. In examples in which EBC 18 includes a composition having both at least one REMS and at least one REDS, the at least one REMS may be less than about 30 wt. % of the composition. In some examples, EBC 18 may include a mixed RE composition REMS or REDS. The mixed RE composition REDS may be selected to improve CMAS resistance, to reduce a difference in the coefficient of thermal expansion between EBC 18 and adjacent coating layers, and/or to lower thermal conductivity, compared to a REDS with only one RE cation. For example, when CMAS-EBC 22 includes a $(Yb, Lu)_2SiO_5$ mixed REMS composition, EBC layer 18 may include $(Yb,Lu)_2Si_2O_7$ mixed REDS composition to reduce a CTE mismatch between CMAS-EBC 22 and EBC 18.

EBC 18 may include any suitable porosity. In some examples, a porosity of EBC 18 may be selected to improve resistance of coating system 14 to chemical attack (e.g., from CMAS), e.g., compared to a more porous coating layer. In some examples, a porosity of EBC 18 may be less than a porosity of CMAS-EBC 22. For example, a porosity of EBC 18 may be less than 15 vol. %, such as less than 10 vol % or less than 5 vol. %. In some examples, a lower porosity of EBC 18 relative to CMAS-EBC 22 may reduce infiltration of CMAS to bond coat 16 and/or substrate 12 better than a similar layer having a greater porosity. Additionally, or alternatively, a porosity of EBC 18 may be selected to improve hermeticity and/or slow the formation of thermally grown oxide at the interface of EBC 18 and an adjacent layer of coating system 14, e.g., bond coat 16 and/or CMAS-EBC 22.

EBC 18 may include any suitable thickness. In some examples, the thickness of EBC 18 may be selected to provide a desired compliance, resistance to chemical attack, CMAS-resistance, or the like. For example, EBC layer 18 has a thickness within a range from about 25 microns (about 1 thousandth of an inch (mil)) to about 254 microns (about 100 mil), such as about 50 microns (about 2 mil) to about 1550 microns (about 60 mil).

In some examples, EBC 18 may include a plurality of EBC layers. For example, additional EBC layers could be added to improve a characteristic of coating system 14, such as, for example, abradability or overall compliance of coating system 14.

Figure 2:
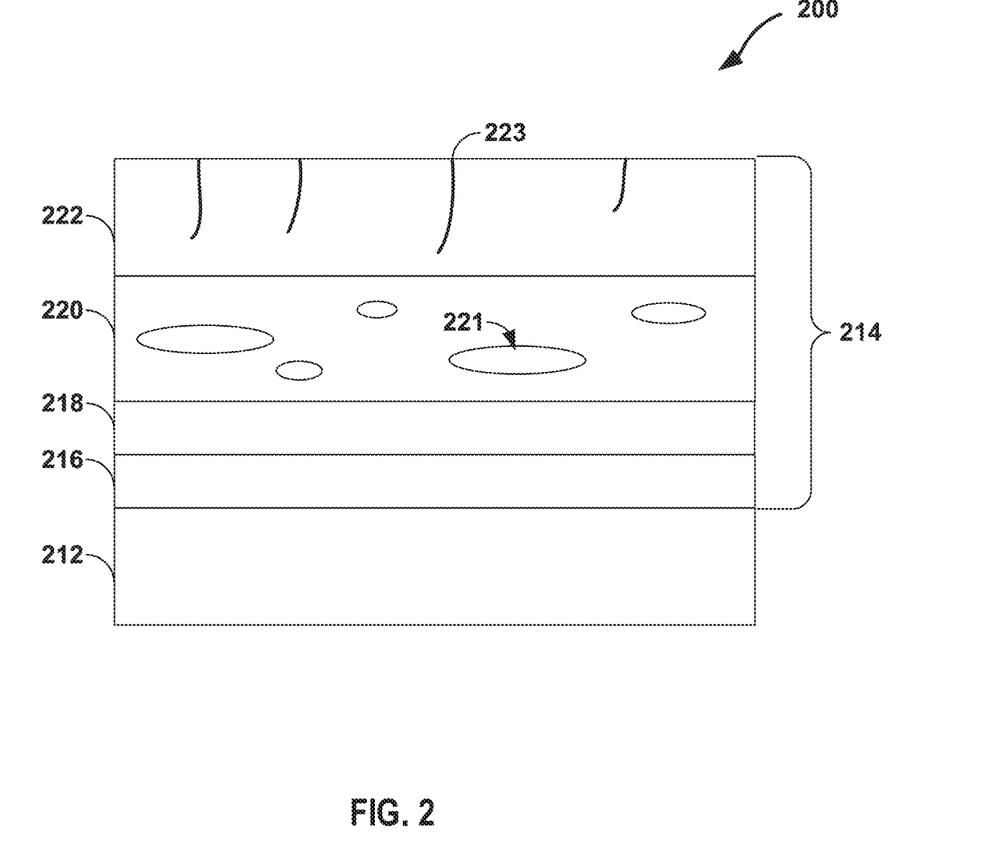
FIG. 2 is a conceptual diagram illustrating an example article including a substrate and a coating system having a two EBC layers and a CMAS-resistant EBC layer that includes a plurality of vertical cracks.

FIG. 2 is a conceptual diagram illustrating an example article 200 including a substrate 212 and a coating system 214. Article 200 may be the same as or substantially similar to article 10 described above in reference to FIG. 1, except for the differences described herein. For example, substrate 212 may be the same as or substantially similar to substrate 12, and coating 214 may include an optional bond coat 216, a first EBC 218, and CMAS-EBC 222 having vertical cracks 223, which may be the same as or substantially similar to optional bond coat 16, optional EBC 18, and CMAS-EBC 22, respectively, as described above.

Coating system 214 also includes intermediate layer 220. Intermediate layer 220 may include a composition configured to provide a selected function for coating system 214, such as, for example, additional protections from chemical attack, improved coating compliance, or other benefits. Although intermediate layer 220 is illustrated on EBC 218, in other examples, intermediate layer 220 may be on bond coat 216 and EBC 218 may be on intermediate layer 220.

In some examples, intermediate layer 220 may include an EBC configured to improve the coating systems abradability or overall coating compliance. For example, intermediate layer 220 may include a REMS/REDS composition ratio that is greater than or equal to the REMS/REDS composition ratio of EBC 218 and less than or equal the REMS/REDS composition ratio of CMAS-EBC 222. Additionally, or alternatively, intermediate layer 220 may include a porosity (e.g., a plurality of pores 221) that is greater than or equal to the porosity of EBC 218 and less than or equal the porosity of CMAS-EBC 222. In some examples, intermediate layer 220 may include a porosity within a range from about 10 vol. % to about 60 vol. %. In some examples, intermediate layer 220 may include a plurality of layers defining a gradient of REMS/REDS ratios and/or of porosities.

Figure 3:
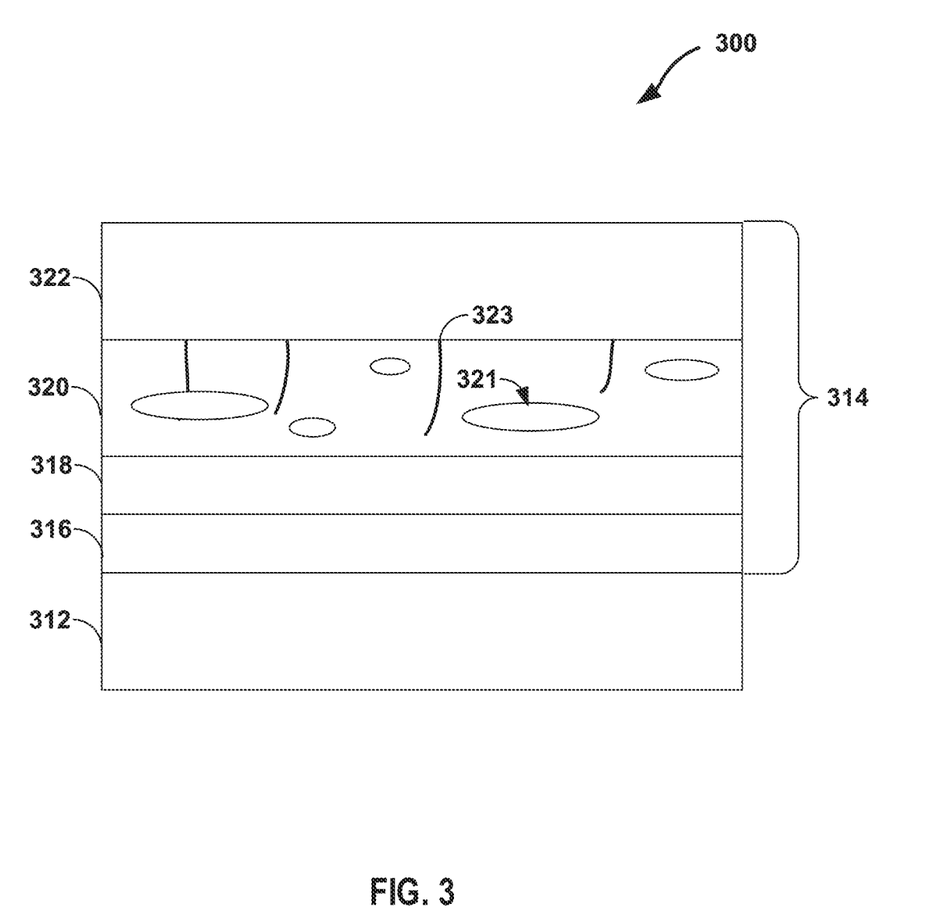
FIG. 3 is a conceptual diagram illustrating an example article including a substrate and a coating system having an EBC layer that includes a plurality of vertical cracks and a CMAS-resistant EBC layer.

In some examples, an intermediate layer may include a plurality of vertical cracks to improve coating compliance. FIG. 3 is a conceptual diagram illustrating an example article 300 including a substrate 312 and a coating system 314. Article 300 may be the same as or substantially similar to article 10 and/or article 200 described above in reference to FIGS. 1 and 2, except for the differences described herein. For example, substrate 312 may be the same as or substantially similar to substrate 12, and coating 314 may include an optional bond coat 316, a first EBC 318, an intermediate layer 320 and CMAS-EBC 322, which may be the same as or substantially similar to optional bond coat 16, optional EBC 18, intermediate layer 220, and CMAS-EBC 22, respectively, as described above.

As illustrated in FIG. 3, CMAS-EBC 322 may be substantially free of vertical cracks and intermediate layer 220 may include vertical cracks, e.g., vertical crack 323. Vertical cracks 323 may reduce stiffness of intermediate layer 320 and relieve stress at an interface between intermediate layer 320 and CMAS-EBC 322. Intermediate layer 320 may include optional pores 321. For example, intermediate layer 320 may include a porosity within a range from about 1 vol. % to about 60 vol. %. In some examples, a porosity of CMAS-EBC 322 may be less than about 15 vol. %. In some examples, CMAS-EBC 322 my include pure REMS or a REMS/REDS composition where the REMS content is less than or equal to about 20 wt. %, and intermediate layer 320 may include a pure REDS or a REMS/REDS composition where the REMS content is less than or equal to about 30 wt. %. In some examples, a porosity of EBC 318 may be less than about 10 vol. % to further enhance the an oxidation resistance of coating system 314.

Figure 4:
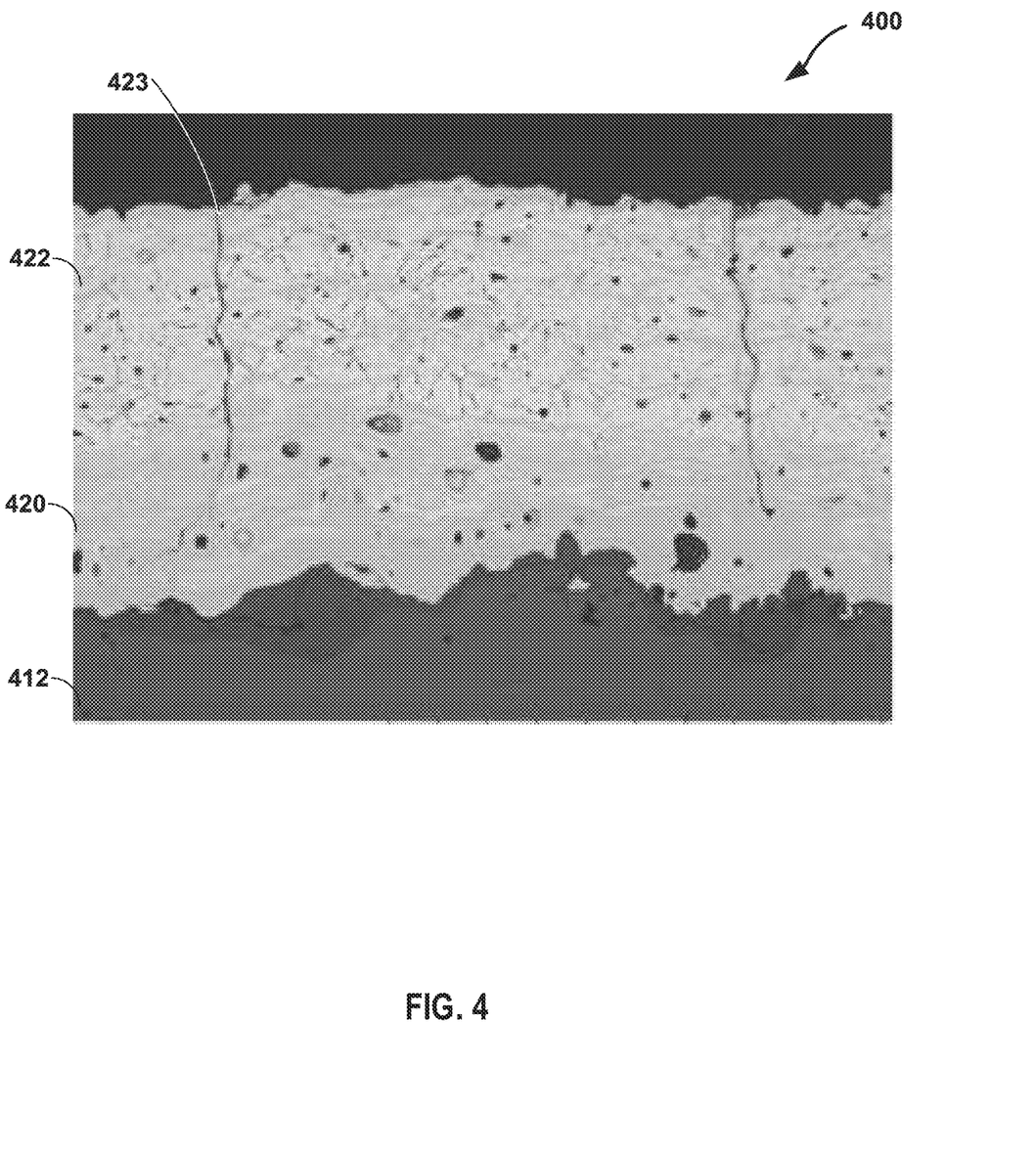
FIG. 4 is a photograph illustrating a cross-section of an example article that includes a substrate and coating system having a CMAS-resistant EBC layer including a plurality of vertical cracks.

FIG. 4 is a photograph illustrating a cross-section of an example article 400 includes a substrate 412 and coating system 414. Coating system 414 includes an EBC 418 and CMAS-EBC 422. EBC 414 is denser relative to CMAS-EBC 422. EBC 414 includes a composition having a greater ytterbium disilicate content relative to CMAS-EBC 422. CMAS-EBC 422 includes vertical cracks, e.g., crack 423, and is more porous relative to EBC 414. Additionally, CMAS-EBC 422 includes a composition having a lesser ytterbium disilicate content relative to EBC 418.

Figure 5:
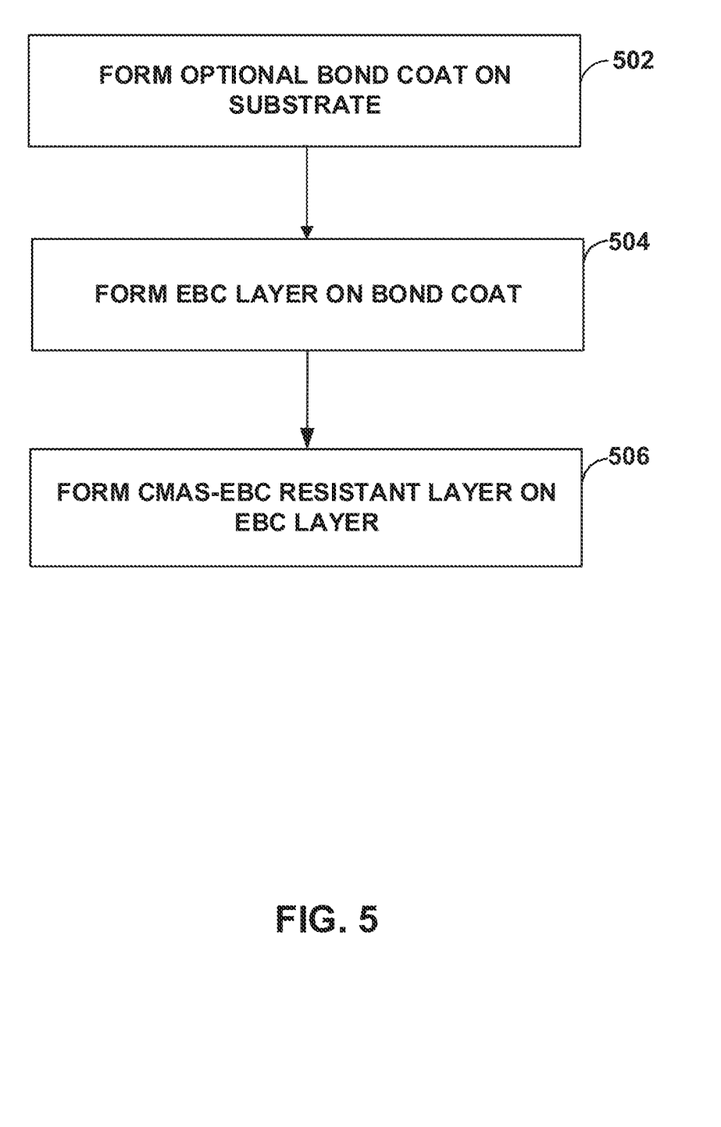
FIG. 5 is a flow diagram illustrating an example technique of forming an article including an coating system in accordance with the disclosure.

FIG. 5 is a flow diagram illustrating an example technique of forming an article including a substrate and a coating system including at least one CMAS-EBC layer having vertical cracks to improve coating compliance. The technique of FIG. 5 will be described with respect to article 10 of FIG. 1 for ease of description. However, in other examples, the technique of FIG. 5 may be used to form articles other than article 10 of FIG. 1, such as articles 200, 300, or 400 described herein.

The example technique of FIG. 5 optionally includes forming bond coat 16 on substrate 12 of article 10 (502). Forming bond coat 16 may include, for example, thermal spraying, e.g., air plasma spraying, HVOF spraying, low vapor plasma spraying, SPS; PVD, e.g., EB-PVD, DVD, cathodic arc deposition; CVD; slurry process deposition; sol-gel process deposition; EPD; or the like. Bond coat 16 may have a composition as described above. Bond coat 16 may promote bonding or retention of subsequently deposited or applied layers, for example, EBC layer 18 and CMAS-EBC 22, on substrate 12.

The example technique of FIG. 5 optionally includes forming EBC layer 18 on bond coat 16 (504). EBC layer 18 may have a composition such as that described herein and may be deposited using any suitable technique, such as, for example, thermal spraying process, APS, SPS, HVOF, low pressure plasma spraying (LPPS), plasma spray-physical vapor deposition (PS-PVD), CVD, DVD, EB-PVD, EPD, slurry process deposition, or sol-gel process.

Following the formation of EBC layer 18, CMAS-resistant layer 22 may be formed on EBC layer 18 (506). CMAS-resistant layer 22 may be formed using any of the suitable techniques described herein, such as, for example, thermal spraying process, APS, SPS, HVOF, LPPS, PS-PVD, CVD, DVD, EB-PVD, EPD, slurry process deposition, or sol-gel process. The CMAS-resistant layer 22 may include a REMS as described herein. As discussed above, the technique selected to form CMAS-EBC 22 may form vertical cracks 23.

In some examples, the technique of FIG. 5 may include mixing selected REMS powders with each other to form a mixed REMS composition, and/or mixing selected REMS and REDS powders with each other to form a REMS/REDS composition. The selected REMS powders and optional REDS powders may include a silicate with a single cation of the desired final product for mixed REMS or REMS/REDS composition, or REMS powders and optional REDS powders with more than one RE cation incorporated into the crystal lattice of the mixed REMS or REMS/REDS composition. For example, starting with powders of single RE cation, those starting powders may be mixed to form one or more phases with any ratio and number of multiple RE cations. The amount of each REMS powder and optional REDS powder in the starting components may be present in any suitable amount to provide for a desired phase composition of CMAS-EBC 22, such as the composition of CMAS-EBC 22 described above. In some examples, each of the REMS powders and optional REDS powders mixed with each may be present in an approximately 1:1 molar ratio (e.g., a substantially equimolar ratio of the powders) or may be in a non-equimolar ratio.

The mixing of the powders may be carried out using any suitable technique. In some examples, the mixing process may include high energy ball milling or other mechanical mixing technique. As another example, liquid precursor processing, such as liquid precursor processing used for individual REMS and optional REDS, may be used. For example, liquid precursors like nitrates may be used as starting materials and mixed in the liquid state, then dried/heat treated to form mixed powders. In the case of a precursor for a plasma spray process, the individual powder could be mixed together using spray drying methods.

The mixed RE monosilicate powders may then be applied directly on EBC layer 18 to form CMAS-resistant layer 22 (504). In some examples, the mixture of powders may be deposited on EBC layer 18 to form a layer and then quenched to form a single REMS phase with multiple RE metal cations or a plurality of REMS phases each with multiple RE cations, where the number of REMS phases is less than the number of starting REMS powder phases.

In some examples, the particles/powders may be pre-alloyed, e.g., with the REMS and REDS being mixed (pre reacted), and/or may be a mixture containing separate particles of REMS or REDS, and/or may be the individual material powders co-sprayed which each other (e.g., where the individual material powders are fed into the thermal spray torch separately and mix in the thermal spray torch/plasma).

Although not shown, in some examples, CMAS-EBC 22 may be heat treated following the formation on EBC layer 18. For example, the as-deposited CMAS-EBC 22 may be comprised of amorphous and crystalline phases (e.g., about 10 vol. % to about 90 vol. % amorphous, e.g., about 40 vol. % amorphous). A heat treatment is performed to transform at least a portion of the amorphous phase to a crystalline phase.

Various examples have been described. These and other examples are within the scope of the following claims and clauses.

What is claimed is:

1. An article comprising:
   a substrate;
   an environmental barrier coating (EBC) layer on the substrate, wherein the EBC layer comprises at least one rare-earth disilicate (REDS), and wherein the EBC layer defines a first surface opposite the substrate; and
   a CMAS-resistant EBC layer on the first surface of the EBC layer, wherein the CMAS-resistant EBC layer comprises at least one rare-earth monosilicate (REMS) configured to react with CMAS to form at least one crystalline reaction product, and wherein the CMAS-resistant EBC layer defines a second surface,
   wherein the EBC layer comprises a plurality of vertical cracks extending from the first surface into the EBC layer, and the CMAS-resistant EBC does not include vertical cracks extending into a surface of the CMAS-resistant EBC,
   wherein a porosity of the CMAS-resistant EBC layer is less than or equal to about 40 volume percent,
   wherein the CMAS-resistant EBC layer further comprises at least one rare-earth disilicate (REDS), and wherein a content of the REMS is equal to or greater than about 20 weight percent, and
   wherein the CMAS-resistant EBC layer and the EBC layer are discrete layers such that an interface is formed at the first surface of the EBC layer between a composition of the CMAS-resistant EBC layer and a composition of the EBC layer.

2. The article of claim 1, wherein the substrate comprises a silicon carbide-based ceramic matrix composite.

3. The article of claim 1, wherein the REMS of the CMAS-resistant EBC layer comprises at least one rare-earth monosilicate including at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

4. The article of claim 1, wherein a density of the plurality of vertical cracks is within a range from about 10 cracks per inch to about 300 cracks per inch.

5. The article of claim 1, wherein a thickness of the CMAS-resistant EBC layer is within a range from about 2 thousandths of an inch (mil) to about 60 mil.

6. The article of claim 1, wherein the EBC layer further comprises at least one REMS, and wherein a content of the REMS in the EBC layer is less than or equal to about 30 weight percent.

7. The article of claim 1, wherein a porosity of the EBC layer is less than or equal to about 10 volume percent.

8. The article of claim 1, wherein the EBC layer is a first EBC layer, and wherein the article further comprises a second EBC layer between the substrate and the first EBC layer, wherein the first EBC layer and the second EBC layer each include the REMS, and wherein the first EBC layer has a REMS/REDS composition ratio greater than a REMS/REDS composition ratio of the second EBC layer.

9. The article of claim 1, wherein the crystalline reaction products comprise a RE apatite phase configured to at least one of reduce infiltration of the CMAS into the CMAS-resistant EBC layer or reduce dissolution of the CMAS-resistant EBC layer.

10. The article of claim 1, wherein CMAS-resistant EBC layer has a substantially uniform composition of the REMS and the REDS in a thickness direction of the CMAS-resistant EBC layer.

11. The article of claim 1, wherein the REMS of the CMAS-resistant EBC layer and the REDS of the EBC layer each includes multiple rare earth metal cations, wherein the multiple rare earth metal cations are selected to improve a coefficient of thermal expansion match between the CMAS-resistant EBC layer and EBC layer compared to REMS and REDS compositions including only a single rare earth metal cation.

12. An article comprising:
a substrate;
a first environmental barrier coating (EBC) layer on the substrate, wherein the first EBC layer comprises a rare-earth disilicate (REDS);
a second EBC layer on the substrate, wherein the second EBC layer comprises the REDS, and wherein the second EBC layer defines a surface and a plurality of vertical cracks extending from the surface into the second EBC layer; and
a CMAS-resistant EBC layer on the surface of the second EBC layer, wherein the CMAS-resistant EBC layer comprises at least one rare-earth monosilicate (REMS) configured to react with CMAS to form at least one crystalline reaction product, wherein a porosity of the CMAS-resistant EBC layer is less than about 15 volume percent, wherein the CMAS-resistant EBC does not include vertical cracks extending into a surface of the CMAS-resistant EBC,
wherein the first EBC layer and the second EBC layer each include the REMS, and
wherein the first EBC layer has a lower REMS/REDS composition ratio than a REMS/REDS composition ratio of the second EBC layer.

13. The article of claim 12, wherein a porosity of the EBC layer is within a range from about 1 volume percent to about 60 volume percent.

14. The article of claim 12, wherein a porosity of the second EBC layer is less than about 10 volume percent.

15. The article of claim 12, wherein the CMAS-resistant EBC layer further comprises at least one rare-earth disilicate (REDS), and wherein a content of the REMS is equal to or greater than about 20 weight percent.

16. The article of claim 12, wherein a content of the REMS in the second EBC layer is less than or equal to about 30 weight percent.

17. An article comprising:
a substrate;
a first environmental barrier coating (EBC) layer on the substrate, wherein the first EBC layer comprises a rare-earth disilicate (REDS);
a second EBC layer on the substrate, wherein the second EBC layer comprises at least one of a rare-earth monosilicate (REMS) or REDS, and wherein the second EBC layer defines a surface and a plurality of vertical cracks extending from the surface into the second EBC layer; and
a CMAS-resistant EBC layer on the surface of the second EBC layer, wherein the CMAS-resistant EBC layer comprises at least one of a REMS or REDS, wherein the CMAS-resistant EBC does not include vertical cracks extending into a surface of the CMAS-resistant EBC.

18. The article of claim 17, wherein the first EBC layer and the second EBC layer each include the REMS and the REDS, and wherein the first EBC layer has a lower REMS/REDS composition ratio than a REMS/REDS composition ratio of the second EBC layer.

19. The article of claim 17, wherein the first rare earth silicate of the second EBC layer includes at least one rare-earth monosilicate (REMS) configured to react with CMAS to form at least one crystalline reaction product.

20. The article of claim 17, wherein the second EBC layer includes a porosity from about 1 vol. % to about 60 vol. %, and the first EBC layer includes a porosity that is less than about 10 vol. %.

* * * * *